May 5, 1931. J. J. MASCUCH 1,804,222
TIRE REPLACING MACHINE
Filed May 31, 1929 4 Sheets-Sheet 2

May 5, 1931.  J. J. MASCUCH  1,804,222
TIRE REPLACING MACHINE
Filed May 31, 1929  4 Sheets-Sheet 3
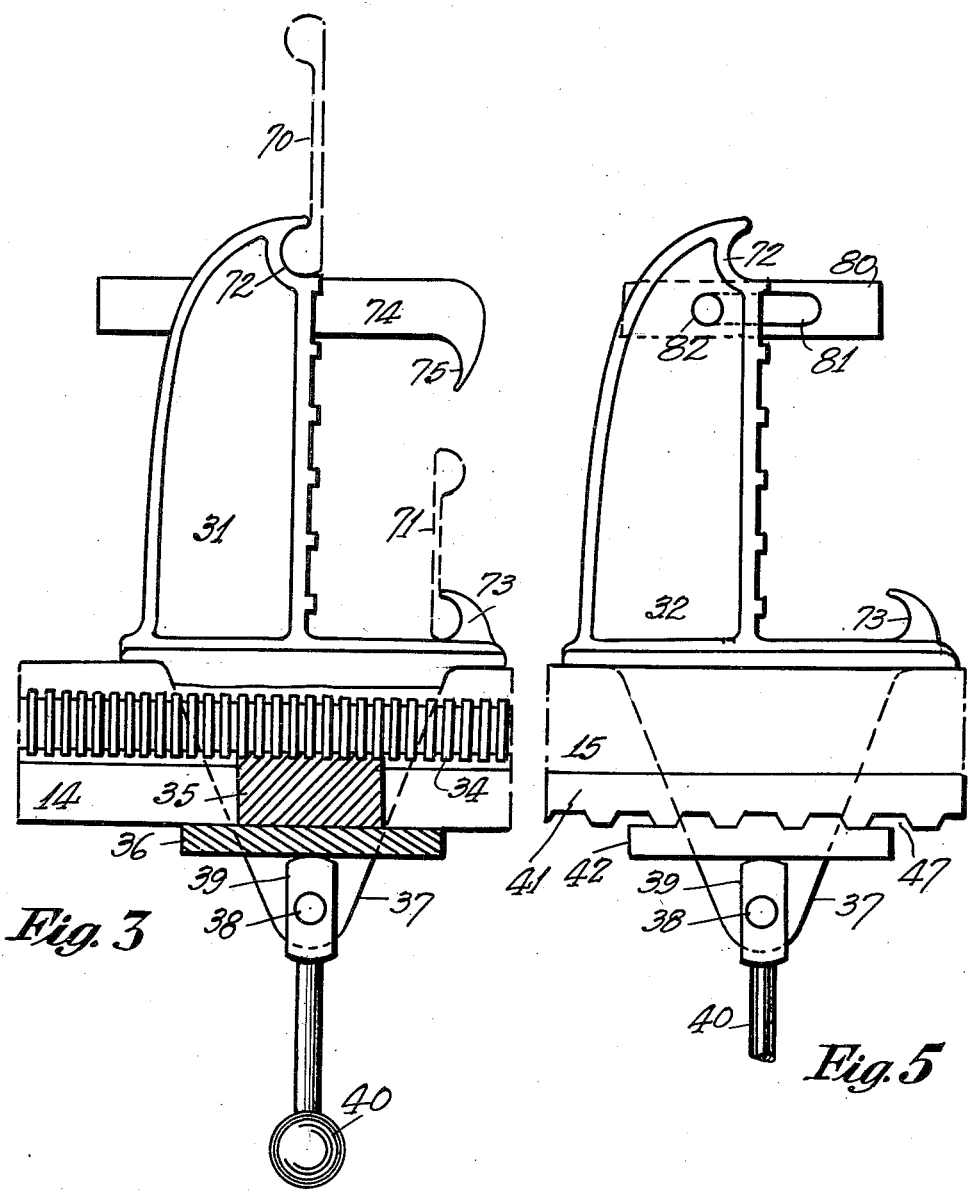
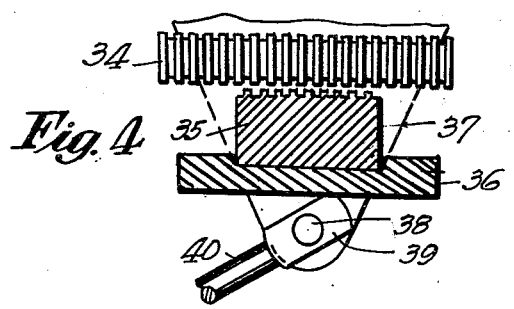
INVENTOR.
Joseph J. Mascuch
BY M. H. Loughridge
ATTORNEY.

May 5, 1931. J. J. MASCUCH 1,804,222
TIRE REPLACING MACHINE
Filed May 31, 1929 4 Sheets-Sheet 4
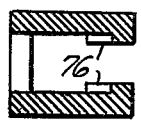
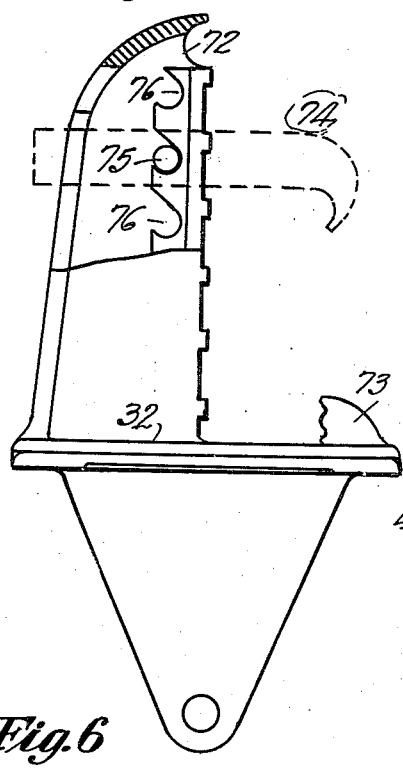
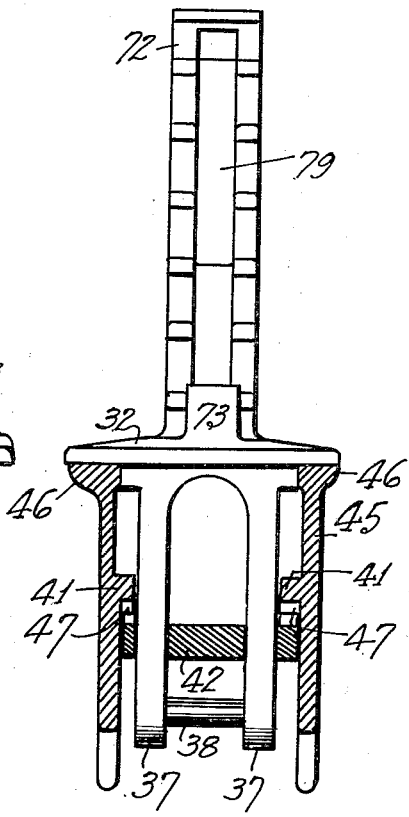
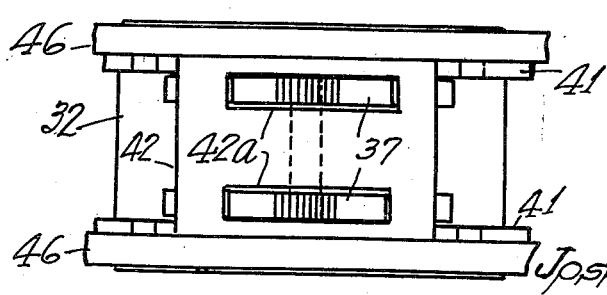

Patented May 5, 1931

1,804,222

UNITED STATES PATENT OFFICE

JOSEPH J. MASCUCH, OF NEWARK, NEW JERSEY

TIRE REPLACING MACHINE

Application filed May 31, 1929. Serial No. 367,299.

Figure 1:
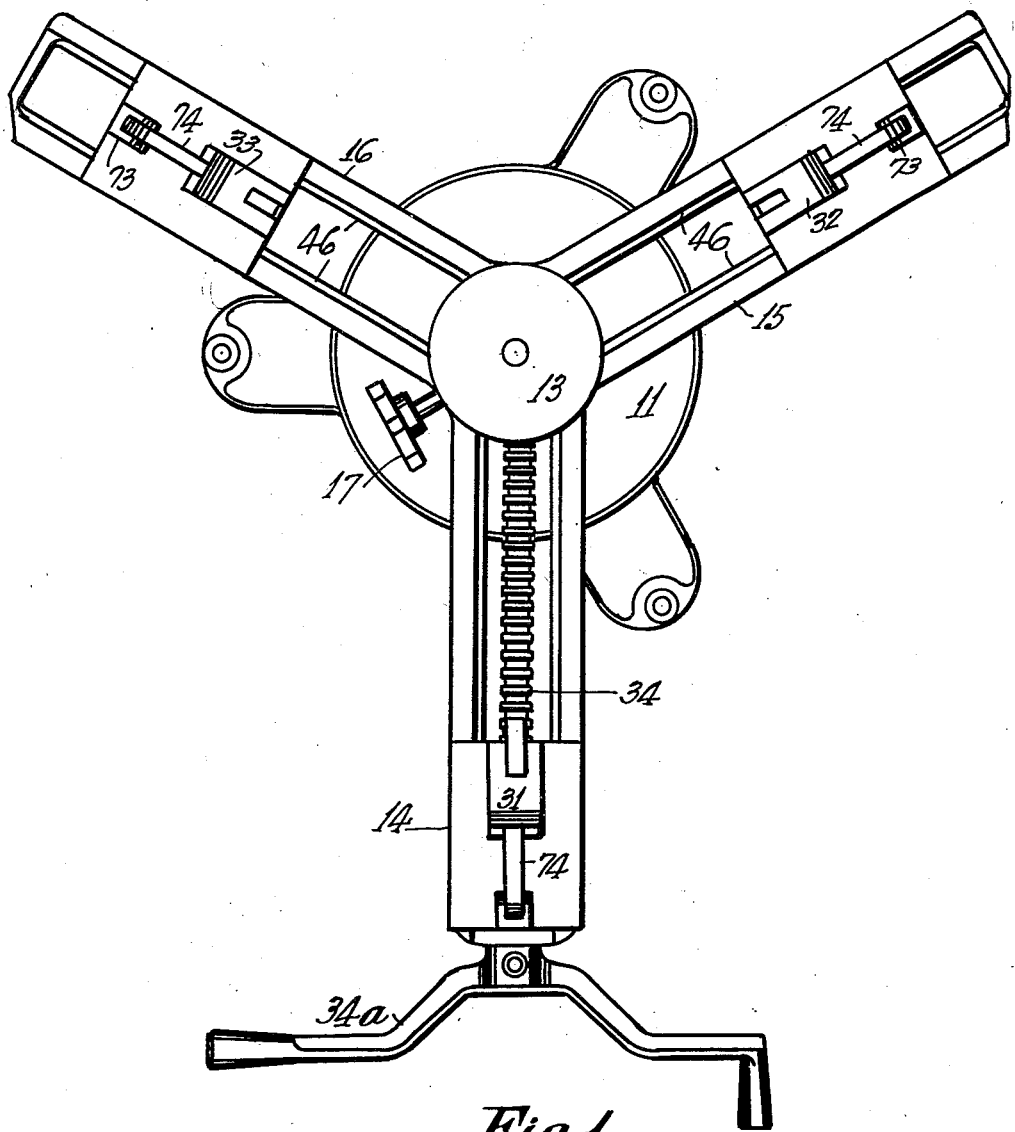
Figure 2:
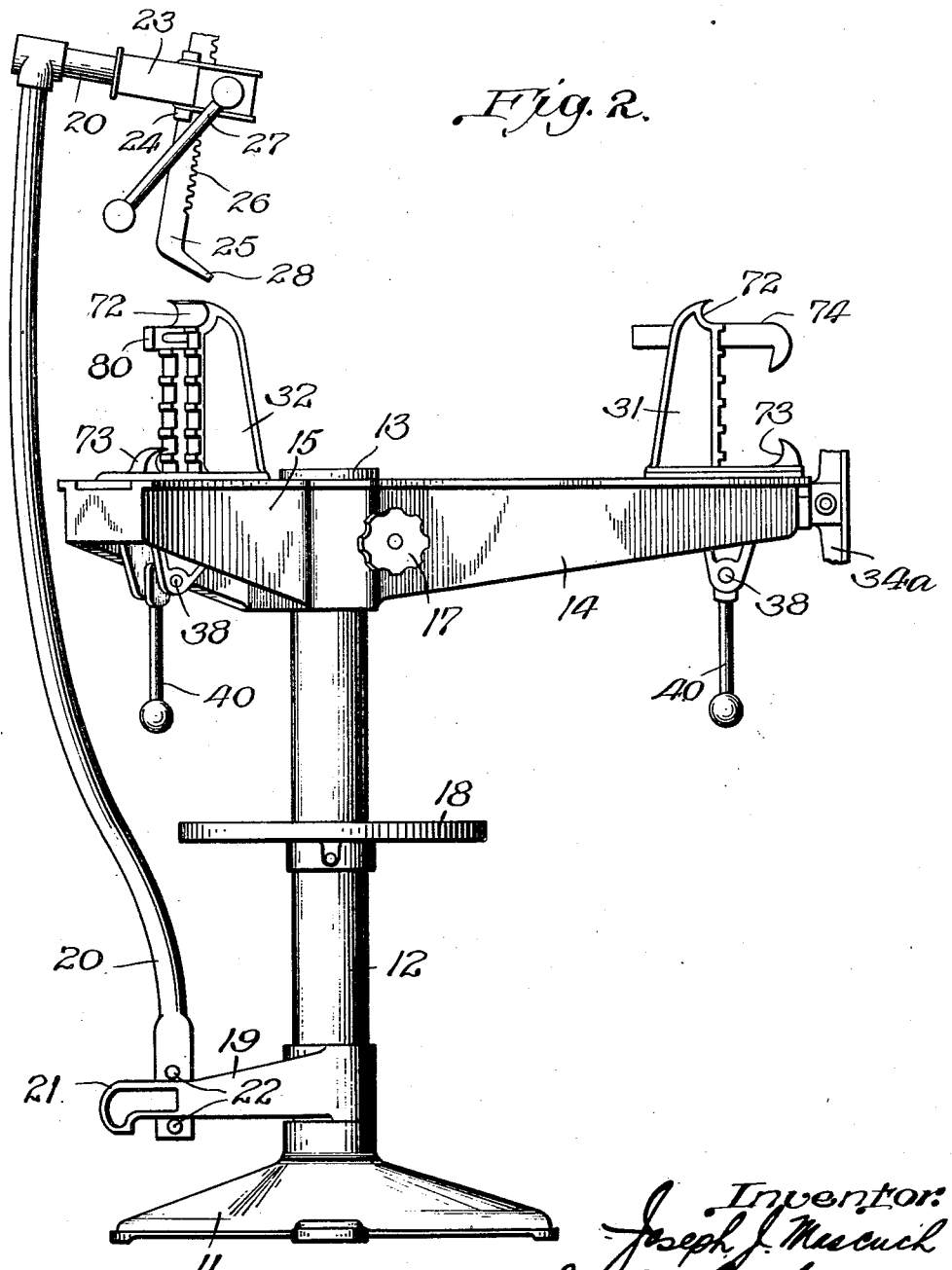

This invention relates to tire changing machines for removing and replacing tires of the solid or pneumatic type and has for an object, to provide a supporting stand adjustable to tires of various sizes; a stand of this type which is adaptable to engage wheel rims in different positions, and a stand of this type fitted with a detachable arm, carrying a mechanism for forcing the tire from the rim. Other objects of the invention will be more particularly understood from the following specification and the accompanying drawings, in which, Fig. 1 is a plan view of a machine constructed according to my invention; Fig. 2 is an elevation of the machine shown in Fig. 1; Fig. 3 is an elevation partly sectioned showing the mounting of the screw adjustable vise head; Fig. 4 is a detail of the construction in Fig. 3; Fig. 5 is an elevation of the rack adjustable vise head; Fig. 6 is a side elevation of the vise head partly sectioned to show the interior construction; Fig. 7 is an end elevation of the vise head with the supporting arms sectioned; Fig. 8 and Fig. 9 are details of Fig. 6, and Fig. 10 is a bottom view of the vise head and supporting arm.

The present invention relates to a machine for collapsing and expanding split rims for automobile tires and is designed to engage rims of various shapes and sizes and the stand on which the rim is supported is provided with a detachable arm which may be rotated about the rim or the rim may be rotated with reference to this arm. This arm carries a shoe operated by a rack and pinion which may be applied to the tire at any point where it is "frozen" to the rim, thereby providing a ready means for removing the tire, while in the ordinary operation of the machine, this arm is removed, and free access can be had to the machine from any direction.

In the drawings, 11 is the base, 12 is the pedestal supporting the triangular frame 14, 15, and 16, which is held in place by the cap 13, and said frame is provided with a socket which engages the stem 12, and is rotatable thereon, being secured against rotation by the hand operated screw 17. A tray may be provided on the pedestal as indicated at 18 for receiving the fittings as they are removed from the rim.

The bracket 19 has a socket engagement with a reduced section of the pedestal 12 and may be rotatably mounted thereon. The outer end of this bracket is bifurcated at 21 forming a hooked jaw as shown, in which the flat portion of the arm 20 is inserted and is held against vertical movement by the pins 22. This arm is offset in a curve to clear the triangular arms 14, 15 and 16, and terminates in a head 23, which is provided with a slide 24 for the shoe 25. This shoe is provided with a rack 26 engaged by a pinion (not shown) operated by handle 27; the lower end of the shoe terminates in the forward projection 28 which is designed to engage the tire adjacent to the rim and can be passed behind the flange of the rim by swinging the arm 20 on the pins 22. It will be noted that arm 20 may be removed from the bracket 19 by turning outwards on the lower pin 22, the upper pin riding on the curved end of 19 at 21, this enables the arm to be instantly attached or removed from the machine.

The arms 14, 15, and 16 are provided with jaws or vise heads as indicated at 31, 32 and 33. In order to save time in the operation of the machine, it is necessary that these vise heads be quickly adjustable on the supporting arms. For this purpose, the jaws or vise heads 32 and 33 are slidably adjustable on the supporting arms and are secured thereto by a rack attachment held in position by a weighted arm, and the vise head 31 to which the tension is applied by the operating handle is slidably positioned on the supporting arm and is locked to the feed screw by a weighted arm.

In Fig. 3, 34 is the feed screw, preferably constructed with a square thread which engages the screw block 35, resting upon the plate 36. The vise head 31 is provided with a depending jaw within the channel of the supporting arm 14, as indicated at 37. The weighted arm 40 is pivoted at 38 to the depending jaw 37, and the cam 39 on this arm engages the plate 36 so that, normally, this plate is raised, thereby raising the screw block 35 into engagement with the screw 34, and causing the vise head 31 to move in response to the operation of the screw. The screw adjustment is used only for applying tension to the rim, for greater movements, the operator grasps the weighted arm 40 pulling it in the direction desired. This removes the support of cam 39 from the plate 36 and thereby disengages the screw block 35 and releases the vise head for sliding movement. As soon as the arm 40 is released, it assumes the vertical position again, thereby bringing 35 into engagement with the screw 34 and locking the vise head in the position to which it has been moved. The released position of the screw block 35 when the arm 40 is deflected is indicated in Fig. 4. The screw 34 is centrally mounted in the arm 14 and is rotated by the operating handle 34a at the end of this arm.

The vise heads 32 and 33 are secured in position as indicated in Fig. 5. In this application the channel of the supporting arms is provided with a ledge on each side as indicated at 41, Fig. 7. These ledges are formed with rack teeth indicated at 47, which are preferably comparatively wide apart, formed on an incline, and comparatively short. These teeth are engaged by the rack plate 42, having complementary teeth and which is brought into engagement with 41 by the cam 39 on the end of the weighted arm 40. It will be noted from Figs. 7 and 10 that the rack plate 42 is provided with apertures at 42a through which the depending jaws 37 of the vise head 32 project, thus bringing the vise head and the rack plate 42 into operative engagement and locking the vise head in position when the arm 40 is vertical. When this arm is deflected in either direction, the plate 42 is disengaged from 41 and the vise head slides on the guides 46 in the channel 45, Fig. 7.

A common form of vise head is shown in the drawings which is adapted to engage wheel rims in various positions as, for instance, at 70 or 71, Fig. 3. The head is formed in a curved jaw indicated at 72 and 73, which engages the curve of the rim flange. The vise heads are preferably formed with a hollow slot as at 79, Fig. 7, which receives the removable tool 74. The opposing sides of the slot 79 are formed in a rack as indicated at 76, Figs. 6 and 8, and the tool 74 is provided with a pin 75, which enters the slot through the widened aperture 78, Fig. 9, and engages the rack 76 with the end projecting through the slot 77. This tool is thus adjustable in elevation and is movable with the vise heads to which it is attached. In Fig. 5, another form of adjustable tool is shown associated with the vise head. This comprises the bar 80 with the slot 81, sliding on pin 82, and sliding through a suitable opening in the rear of the vise head. The tool 80 supports the rim and tire in position to be engaged by the jaw 72, the tool 74 is provided with a hook at 75, which may be used in co-operation with 73 to engage opposite edges of the rim. When these tools are not in use, they can be slid into the slot 79 of the vise head and are thereby removed out of the way in the free operation of the vise heads for other purposes. It will be understood that the vise heads may be constructed in various forms to suit the type of tire and rim for which the machine is designed and the entire frame supporting the tire is rotatable about the stem 12 and is thus readily accessible.

Having thus described my invention, I claim:

1. A tire changing machine comprising a frame having channel shaped arms with a pair of racks formed on inwardly projecting, parallel ledges in each of said channels, vise heads slidable on each of said arms, a jaw depending from each vise head in said channels between said racks, a rack plate for each jaw having teeth arranged to engage said racks and having apertures for the members of said jaw whereby it may be moved vertically on said jaw to engage said racks and thereby hold the vise head in position and a weighted arm pivoted to each jaw having a cam engaging said plate for raising and lowering said plate.

2. A tire changing machine comprising a frame having a channel shaped arm with a pair of racks formed on the under side of projecting parallel ledges integral with said channel, a vise head slidable on said arm having a jaw depending in said channel between said racks, a rack plate having teeth aligning with said racks and having apertures for the members of said jaw whereby it may be moved vertically on said jaw to engage said racks and thereby hold the vise head in position and a weighted arm pivoted between said jaws and having a cam engaging said plate between said jaws for raising and lowering said plate.

In testimony whereof I affix my signature.

JOSEPH J. MASCUCH.